Feb. 14, 1928.
R. E. JENKINSON
METHOD OF MAKING TIRES
Filed Aug. 8, 1925
1,659,321
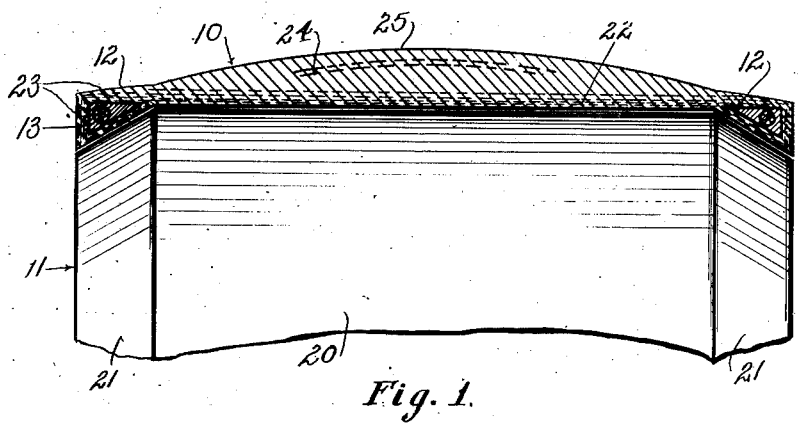
Fig. 1.
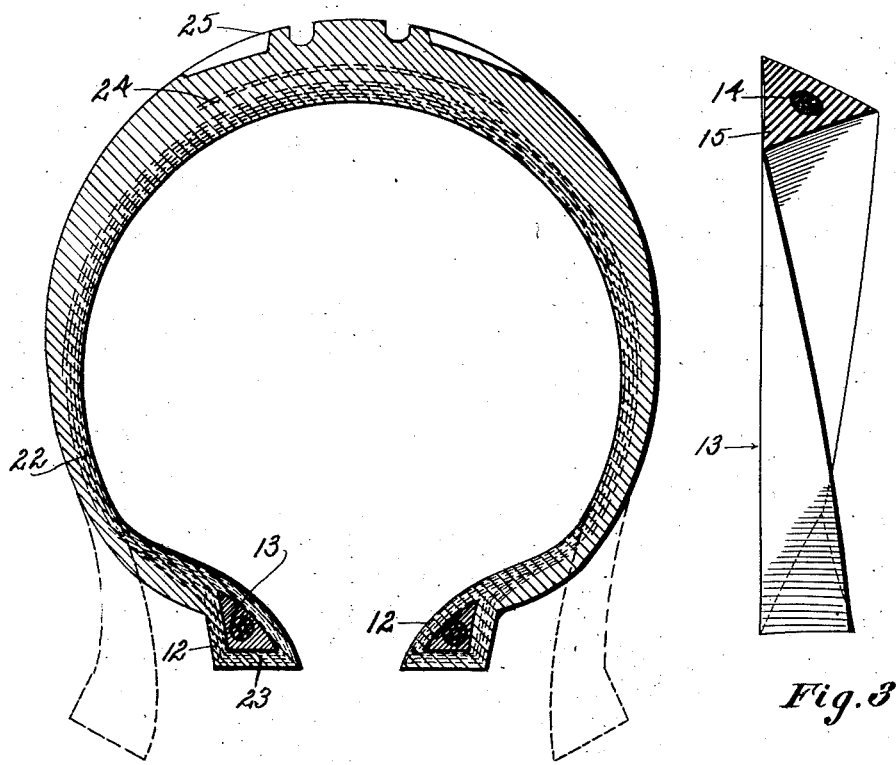
Fig. 2.
Fig. 3.
INVENTOR
Ross E. Jenkinson.
BY
ATTORNEY Patented Feb. 14, 1928.

1,659,321

UNITED STATES PATENT OFFICE.

ROSS E. JENKINSON, OF AKRON, OHIO, ASSIGNOR TO THE GOODYEAR TIRE & RUBBER COMPANY, OF AKRON, OHIO, A CORPORATION OF OHIO.

METHOD OF MAKING TIRES.

Application filed August 8, 1925. Serial No. 49,115.

My invention relates to the manufacture of pneumatic tires, and it has particular reference to a method of treating the bead members which form a part of such tires.

The object of the invention resides in the provision of means to overcome a tendency of the bead portions of tires to separate more than a normal distance.

In the drawings:

Fig. 1 is a diagrammatic view, partially in cross-section, and partially in broken elevation, of a tire carcass assembled on a cylindrical mandrel;

Fig. 2 is a cross-sectional view of a finished tire, made in accordance with the principles of the invention; and Fig. 3 is a perspective view of a portion of a bead.

Tires assembled on cylindrical mandrels and subsequently shaped, are spoken of as "flat built", as distinguished from tires formed on a "core", or a mandrel, having the general contour of a finished tire. Flat building possesses manufacturing advantages which make it a more desirable method than core building, but tires made by the flat built method have been open to a defect which outweighed, from a practical viewpoint, the advantages gained in manufacturing operations. This defect consists in a tendency of the bead portions of the finished tire to spread more than a normal distance. For example, a finished tire made by either the flat built or core building methods should have the general shape indicated by the full lines of Fig. 2. The bead portions of the flat built tires, however, exhibit a tendency to return to their original position, such as shown in Fig. 1. Tires made by the flat built process which were shaped, vulcanized and subjected to pressure within the mold for several days, nevertheless exhibited this effect sufficiently to cause the bead portions of the tire to separate to substantially the position indicated by the dotted lines in Fig. 2. It is apparent that a tire which will not retain its shape is more difficult to assemble on a wheel, more apt to fail along the rim, and is generally unsatisfactory as an article of commerce.

The solution offered to overcome this objectionable spreading may be explained by considering the stresses which are developed in the tire during its assembly and subsequent vulcanization, although it is to be understood that the practicability of the invention is in no way dependent upon the correctness of the theoretical considerations discussed herein. If a tire carcass, represented generally by the reference numeral 10, be assembled on a cylindrical mandrel 11, it is apparent that the bead portions 12 of the tire must be revolved through a considerable angle, when the tire is brought to the shape shown in Fig. 2. Each bead portion 12 has securely fastened therein a bead, indicated generally by the reference numeral 13, which must rotate as an entirety when the carcass is shaped. The bead has a considerable cross-sectional diameter, and if it be rotated about the center of its cross-sectional diameter, it will be apparent that portions positioned within or near the original inner circumference will be moved toward the outer circumference, which is of greater relative diameter. Thus such portions will be stretched, and the portions of the bead near the original outer circumference will move inwardly to a position where the bead diameter is reduced and these portions will be compressed. In other words, the rotation of the bead results in a molecular displacement, or strain, which exhibits itself by a stress tending to spread the bead portions of the finished tire.

The bead illustrated in Fig. 3, comprising a core 14, composed of a number of steel wires bound together to form a cable, and a cover 15 of semi-vulcanized rubber, has been found satisfactory in tires, but presents perhaps the most difficult condition to overcome with respect to the spreading phenomenon. Beads with inextensible cores, such as steel, are particularly desirable in straight side tires, but it is apparent that a steel cable having a high modulus of elasticity, will offer a proportionate resistance to deformation and hence exert a relatively large force tending to separate the bead portions of the vulcanized tire. The stress set up in the covers of the beads may be removed by the final vulcanization, when the plastic semi-vulcanized rubber assumes the properties of an elastic body. However, the vulcanizing temperature is not sufficient to produce a molecular rearrangement in the steel cores, and hence the major portion of the distorting stress cannot be removed in this manner.

If the tire carcass 10 and the rubber covers 15 be rotated to the desired shape, without concurrent rotation of the cores 14, it is apparent that all of the torsional stress tending to distort the finished tire will be confined to that part of the structure in which it may be neutralized by subsequent heat treatment. Such rotation will yield the same finished structure, without an unbalanced force in the inextensible steel cores of the beads. This result may be accomplished by loosening the rubber cover 15 on the core 14, prior to assembly of the beads 13 with the carcass 10. When the core is loose with respect to the cover, it is free to slip inside of the rotating carcass, and thus torsional stress is not developed within the bead core. Hence there is no displacement within the core which would cause a stress tending to spread the bead portions of the finished tire beyond a normal distance.

The cover may be loosened on the core readily while the bead is still warm from its initial partial cure. At that time, the rubber of the cover 15 has not penetrated all of the space between the strands of the cable 14. If a bead be twisted in the hands, while still warm, to effect a displacement of the faces such as is shown in Fig. 3, it will be found that the cover will loosen on the core, but, if the bead be allowed to cool, considerable effort is required to loosen the cover at all points. After the cover has been loosened on the entire core, it is straightened out to its natural position, so that all edges of the bead lie in their proper planes. The bead is then ready for assembly on the mandrel in accordance with customary practice.

One method of assembling the carcass is shown in Fig. 1. The mandrel 11 may be of any desired type, but it is shown as having a cylindrical face 20 and tapered edges 21. The carcass 10 is assembled by stretching a suitable number of bands or strips of rubberized fabric 22, over the mandrel, and superimposing the beads 13 over the bands on the tapered portions 21. The beads are shown as triangular in section, and as having a base angle corresponding substantially to the taper of the mandrel, but it is to be understood that these details are illustrative and not indispensable. After the beads 13 are properly positioned, the edges of the fabric bands are reversed, as indicated at 23, over the beads 13, to secure the parts in proper position. The structure may be completed by the addition of the customary breaker strip 24 and rubber tread strips 25. After all the parts have been stitched in place, the carcass is removed from the mandrel, and shaped on a suitable core. During the shaping operation, the cores of the beads slip in response to the torsional stress. The carcass may then be vulcanized in a suitable mold, and during vulcanization, the rubber cover 15 of the bead is again firmly united to the core 14. The finished tire is substantially the same in construction as if the cover of the bead had not been broken initially, but it is more durable and serviceable, inasmuch as the forces which separate the bead portions of the tire have been removed.

It is apparent that the principles of the invention are not limited to the specific embodiment described, and it is intended that only such limitations should be imposed as are set forth in the following claims.

What I claim is:

1. A method of making tires which comprises forming a bead having a core and a rubber cover, loosening the cover on the core and incorporating a plurality of the beads in a tire.

2. A method of making tires which comprises forming a bead member having a core and a rubber cover, subjecting the bead to a partial cure, rotating the cover with respect to the core, and assembling the bead so treated in a tire carcass.

3. A method of making tires which comprises forming a bead having a core and a cover, partially vulcanizing the rubber of the bead, loosening the cover on the core, assembling the bead in a tire carcass on a cylindrical mandrel, deforming the assembled structure into substantially the shape of a finished tire, and vulcanizing the carcass.

4. The method of forming a pneumatic tire comprising beads having inextensible cores, which consists in loosening the body of the bead with respect to the core, assembling the bead in a tire carcass on a cylindrical mandrel, and shaping the carcass into the general form of the tire while permitting the core to remain in a fixed plane relative to the carcass.

5. A method of making tires which comprises manufacturing a non-extensible tire bead having a core and a flexible cover, treating the bead during the course of manufacture so as to prevent adhesion between the surface of the core and the cover, incorporating the bead into a flat built tire and expanding the tread of the latter to cause the cover of the bead to rotate about the core without distorting the latter.

In witness whereof, I have hereunto signed my name.

ROSS E. JENKINSON.